United States Patent
Anderson et al.

(10) Patent No.: US 11,245,963 B2
(45) Date of Patent: Feb. 8, 2022

(54) METHODS AND APPARATUS TO DETERMINE WHEN A SMART DEVICE IS OUT-OF-TAB

(71) Applicant: The Nielsen Company (US), LLC, New York, NY (US)

(72) Inventors: Michael Evan Anderson, Chicago, IL (US); Samantha M. Mowrer, San Francisco, CA (US); Robert Gottesman, Chicago, IL (US); Astha Jain, El Cerrito, CA (US)

(73) Assignee: The Nielsen Company (US), LLC, New York, NY (US)

( * ) Notice: Subject to any disclaimer, the term of this patent is extended or adjusted under 35 U.S.C. 154(b) by 87 days.

(21) Appl. No.: 16/862,501

(22) Filed: Apr. 29, 2020

(65) Prior Publication Data
US 2021/0344997 A1    Nov. 4, 2021

(51) Int. Cl.
| | | |
|---|---|---|
| *H04H 60/31* | (2008.01) | |
| *H04H 60/37* | (2008.01) | |
| *H04H 60/45* | (2008.01) | |
| *H04N 21/442* | (2011.01) | |
| *H04N 21/658* | (2011.01) | |

(52) U.S. Cl.
CPC ...... *H04N 21/44222* (2013.01); *H04H 60/31* (2013.01); *H04H 60/37* (2013.01); *H04H 60/45* (2013.01); *H04N 21/6582* (2013.01)

(58) Field of Classification Search
CPC .................. H04N 21/4126; H04N 21/422
See application file for complete search history.

(56) References Cited

U.S. PATENT DOCUMENTS

| | | | |
|---|---|---|---|
| 8,000,993 | B2 | 8/2011 | Harvey et al. |
| 8,973,023 | B1 | 3/2015 | Rao et al. |
| 10,511,873 | B1 | 12/2019 | Voytenko et al. |
| 2009/0292587 | A1 | 11/2009 | Fitzgerald |
| 2013/0159499 | A1 | 6/2013 | Besehanic |
| 2015/0054639 | A1 | 2/2015 | Rosen |
| 2019/0158916 | A1 | 5/2019 | Shankar et al. |
| 2019/0356955 | A1 | 11/2019 | Nagaraja Rao et al. |
| 2019/0378034 | A1 | 12/2019 | Mowrer et al. |
| 2020/0117979 | A1 | 4/2020 | Sullivan et al. |
| 2020/0196008 | A1 | 6/2020 | Chimenti et al. |
| 2020/0226465 | A1 | 7/2020 | Harrington et al. |

FOREIGN PATENT DOCUMENTS

| | | |
|---|---|---|
| JP | 2019009775 | 1/2019 |
| KR | 101893475 | 10/2018 |

OTHER PUBLICATIONS

International Searching Authority, "Search Report and Written Opinion," issued in connection with PCT Application No. PCT/US2021/029720, dated Aug. 19, 2021, 8 pages.

*Primary Examiner* — Rong Le
(74) *Attorney, Agent, or Firm* — Hanley, Flight & Zimmerman, LLC (57) ABSTRACT

Methods, apparatus, systems and articles of manufacture to determine whether a smart device is in-tab are disclosed. An example apparatus includes a labelled data generator to identify a first smart television that corresponds to a first panelist by comparing first data from the first smart television to second data from the first panelist; and generate training data by labelling the first smart television as in-tab or out-of-tab based on the second data from the first panelist; and a model trainer to train a model using the training data, the model trainer to train the model to determine a tab status for a second smart television.

20 Claims, 6 Drawing Sheets

METHODS AND APPARATUS TO DETERMINE WHEN A SMART DEVICE IS OUT-OF-TAB

FIELD OF THE DISCLOSURE

This disclosure relates generally to artificial intelligence, and, more particularly, to methods and apparatus to determine when a smart device is out-of-tab.

BACKGROUND

Some smart devices (e.g., smart televisions, smart telephones, tablets, etc.) collect data related to media output by the smart device (e.g., what videos the user was exposed to, what audio the user was exposed to, how much time audio and/or video was output, channel/station changes, average tuning time per day, total number of cumulative tuning minutes, etc.). The smart device uses a wireless network to transmit the smart device media exposure data to a server. A smart device is considered to be in-tab when the smart device transmits collected data to the server of the threshold amount of time. However, when access to the wireless network is unavailable and/or incapable of transmitting data (e.g., due to a poor connection, slow speeds, large amount of noise, technical errors, etc.), the smart device is considered out-of-tab.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An audience measurement entity (AME) typically monitors media presentation activity (e.g., viewing, listening, etc.) of the monitored panelists via audience measurement system(s), such as a metering device(s), a portable people meter (PPM) (also known as portable metering devices and portable personal meters), and/or a local people meter (LPM). Panelists, or monitored panelists, are audience members (e.g., household members, users, etc.) enlisted to be monitored, who divulge and/or otherwise share their media activity and/or demographic data (e.g., race, age, income, home location, education level, gender, etc.) to facilitate a market research study.

Audience measurement typically includes determining the identity of the media being presented on a media output device (e.g., a television, a radio, a computer, etc.), determining data related to the media (e.g., presentation duration data, timestamps, radio data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

When the audience measurement entity (AME) enlists panelists to be part of a panel, the audience measurement entity may provide the panelist with a meter to collect data (e.g., meter data) related to media that the panelist and/or household members are exposed to. Examples disclosed herein leverage meter data from panelists to be able to train a model (e.g., a machine learning model) to determine whether a smart television is in-tab or out-of-tab for a duration of time.

A smart television may gather data relating to the use of the smart television. For example, a smart television may log user interactions with the television and/or other statuses of the television (e.g., channel changes, volume changes, network status, operating mode, connected device data, etc.) along with corresponding timestamps. Additionally, the smart television may log captured screen shots of the smart television and/or extracted codes from video and/or audio output by the smart television with corresponding timestamps. The smart television transmits the obtained data (e.g., smart television data) to an external server for further processing. The external server may process the smart television data to generate media exposure data. For example, the server may compare the screen shots and/or codes to reference screen shots and/or codes to identify the media presented by the smart television data. In such an example, the server may link the determined media, media type, etc. to the corresponding smart box data to expand on the smart television data from the smart television. In this manner, the smart television data can further include media identifiers.

However, when a smart television has no network connection, a poor network connection, and/or is otherwise unable to transmit data to the server, the server does not obtain any data from the smart television. As used herein, a smart television is considered to be in tabulation (in-tab, for short) when the television sends smart television data within a threshold amount of time and is considered out of tabulation (e.g., out-of-tab for short) when the television is unable to send smart television data within the threshold duration of time due a technical issue (e.g., no network, poor network, and/or another technical reason that prevents the smart television from transmitting data to the server). Additionally or alternatively, a smart television is considered to be in-tab when data was sent from the smart television for more than a threshold fraction of a duration of time. Because an out-of-tab television does not send data to the server, the server will not know whether the smart television was off (e.g., not presenting media) or whether the smart television was on (e.g., presenting media) but could not submit smart television data. Accordingly, the server may assume that the television was off and not credit media that was actually presented. Although some smart televisions transmit network disconnect data (e.g., number of disconnects, length of disconnects, reason for disconnect etc.) that may correspond to the device being out-of-tab, most smart televisions inaccurately differentiate between being off and losing a connection. Accordingly, using such data also results in inaccurate media crediting results.

Examples disclosed herein determine what smart television data may look like when a smart television is in-tab versus what smart television data may look like when a smart television is out-of-tab by leveraging panelist data that is linked to a smart television. For example, examples disclosed herein train a model (e.g., an artificial intelligence (AI)-based model, such as a machine learning model, a logistic regression model, a random forest model, a neural network, etc.) based on smart television data from a smart television that is linked to panelist data. Once trained, the model can utilize subsequent smart television data to be able to determine (e.g., predict) whether the smart television is in-tab. Accordingly, examples disclosed herein utilize AI to determine whether a smart television is in-tab or out-of-tab based on smart television data (e.g., data collected by a smart television and/or processed by server).

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a logistic regression and/or a random forest is used. However, other types of machine learning models could additionally or alternatively be used such as machines, neural networks (e.g., convolution neural network (CNN), deep neural network (DNN)), deep learning and/or any other type of AI-based model.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using panelist data from panelist meters and smart television data from servers in a network. However, any other training algorithm may additionally or alternatively be used. In examples disclosed herein, training is performed until an acceptable amount of error is achieved. In examples disclosed herein, training is performed at a server of the audience measurement entity. Training is performed using hyperparameters that control how the learning is performed (e.g., a learning rate, a number of layers to be used in the machine learning model, etc.). In some examples re-training may be performed. Such re-training may be performed in response to additional panelist data, additional smart television data, changes in the panel and/or changes in the smart television data.

Training is performed using training data. In examples disclosed herein, the training data originates from panel meters and/or servers on a network. Because supervised training is used, the training data is labeled. Labeling is applied to the training data by an audience measurement entity and/or by the servers.

Once training is complete, the model is stored and/or deployed for use as an executable construct that processes an input and provides an output based on the network of nodes and connections defined in the model. The model is stored at the server of the audience measurement entity. The model may then be executed by an in-tab analyzer of the audience measurement entity to determine whether a smart television is in-tab or out of tab based on smart television data.

Once trained, the deployed and/or stored model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, the output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 1:
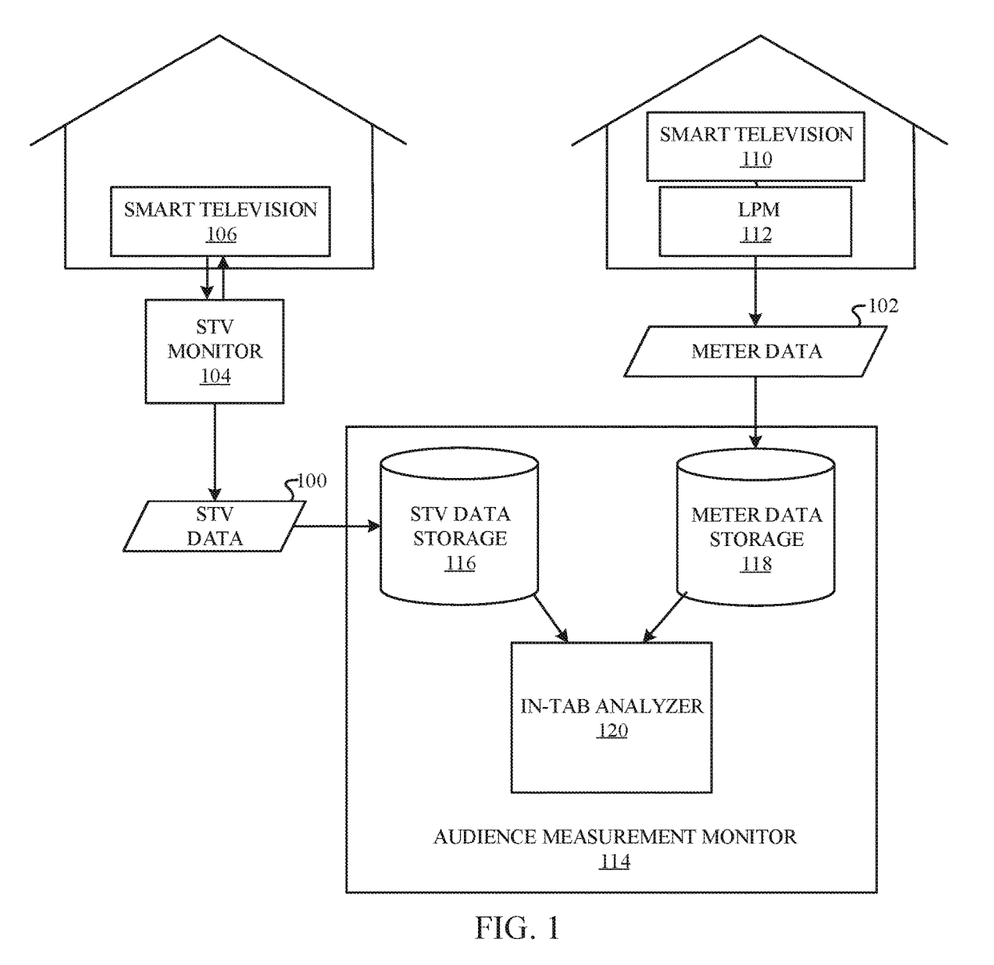
FIG. 1 illustrates an example in-tab monitoring environment structured according to the teachings of this disclosure to determine when a smart device is out-of-tab.

FIG. 1 is a block diagram of an environment in which example smart television (STV) data 100 and example meter data 102 are collected to train, and/or apply to, a model to determine whether a smart television is in-tab or out-of-tab. FIG. 1 includes the example STV data 100, the example meter data 102, an example STV monitor 104, example smart televisions 106, 110, an example local people meter (LPM) 112, and an example audience measurement monitor 114. The example audience measurement monitor 114 includes an example STV data storage 116, an example meter data storage 118, and an example in-tab analyzer 120.

The example STV monitor 104 of FIG. 1 is a server (e.g., an automatic content recognition (ACR) server) that may be operated by a service provider (e.g., cable media service provider, a radio frequency (RF), AMAZON™, YOUTUBE™, NETFLIX™, etc.), media provider (e.g., HBO™, ABC™, etc.), a manufacturer of the smart television 106 (e.g., LG™), and/or a third party entity (e.g., APPLE™, ANDRIOD™, etc.) that collects information from the smart television 106. The collected information may include tuning data (e.g., channels/stations/media presented by the smart television 106 at particular points of time including corresponding timestamps), volume data, channel change information, network connectivity information (e.g., whether the smart television 106 was connected to a wireless network or not, number of disconnects, length of disconnects, shutoff-type events vs. disconnect-type events, etc.), application information, whether the smart television 106 was on or off, screenshots or part or all of the screen with corresponding timestamps for when the screenshots were taken, and/or any other information corresponding to the use of the smart television 106.

The STV monitor 104 of FIG. 1 can use obtained data to determine how a user interacted with the smart television 106 including the media output by the smart television 106. In some examples, when the smart television 106 is outputting media from an external device (e.g., a set top box, a DVD player, a video game counsel, etc.), the smart television 106 may not know what media is being output. In such examples, the smart television 106 may transmit (a) one or more screen shots of the video portion of the media being displayed, (b) one or more samples of the audio portion of the media, and/or (c) extracted code(s) embedded in the video and/or audio of the media with corresponding timestamps and transmit to the STV monitor 104. The STV monitor 104 can compare the screen shot(s), audio sample(s), and/or code(s) to a database of reference screen shot(s), audio sample(s), and/or code(s) to identify the media in conjunction with any signaturing, fingerprinting, and/or watermarking technique. In this manner, the STV monitor 104 can determine tuning data for the smart television 106 and/or what media the smart television 106 is presenting, even when the device being tuned is external to the smart television 106.

In some examples, the STV monitor 104 may process the information from the smart television 106 to generate tuning data by determining the amount of tuning by the smart television 106 per duration of time (e.g., a day), an average amount of tuning per duration of time (e.g., a day) across a second duration of time (e.g., a week, a month, etc.), a standard deviation in tuning per day across the second duration of time, a number of disconnects per the duration of time, a length of the disconnects per the duration of time, whether the disconnect(s) correspond to a shut-off event (e.g., turn off, loss of power, and/or any other event that causes media to not be output by the smart television 106) vs. a disconnect-type event (e.g., loss of network, technical problem, and/or any other event that causes the smart television 106 to not transmit collected data to the STV monitor 104). Additionally, the STV monitor 104 may split the duration of time (e.g., a day) into subsets (e.g., 1 hour increments, 3 hour increments, etc.) and calculate the above metrics for the subsets. The STV monitor 104 transmits the STV data 100 to the example audience measurement monitor 114. The STV data 100 includes tuning data (e.g., data from the smart television 106 and/or the above-data determined at the STV monitor 104 based on sampling the media), media identifier(s), timestamp(s) (e.g., corresponding to tuning events, disconnects, on/off states, channel changes, etc.), smart television identifier, and/or any other data of the smart television (e.g., network status, number of disconnects, on/off state, volume, control information, etc.).

The example smart television 106 of FIG. 1 is a smart television (e.g., a television that is capable of transmitting and/or receiving data via a network). However, the example smart television 106 may be a radio, speakers, a projector, a computer, a computing device, a tablet, a mobile device, and/or any other device capable of outputting media and that is capable of transmitting and/or receiving data via a network. In some examples, the smart television 106 is connected to a media presentation device, such as a set-top box, an antenna (e.g., for over-the-air media), an over-the-top (OTT) device, a video game console, a digital video recorder (DVR), a digital versatile disc (DVD) player, a receiver, a router, a server, a computer, a mobile device, software executed by a website, computer, and/or application, and/or any device that receives media from a service provider. For example, a website and/or application may provide media to users via the smart television 106. When a media presentation device is operating to access media, the smart television 106 receives media corresponding to a station, program, website, etc., based on the tuning of the example media presentation. The example smart television 106 is given a unique serial number that, when associated with subscriber information, allows the smart television monitor 104, an audience measurement entity (e.g., such as the audience measurement monitor 114), a marketing entity, and/or any other entity to ascertain specific subscriber behavior information. The smart television 106 transmits collected data (e.g., tuning data, control data, screen shots, audio samples, extracted codes, interaction data, control data, network data, etc.) with corresponding timestamps and the unique identifier to the example STV monitor 104 for further processing. Although the illustrated example of FIG. 1 includes the example STV monitor 104 receiving data from one smart television (e.g., the example smart television 106), at one location, the example STV monitor 104 may receive data from any number or type(s) of smart televisions, at any number of locations. The STV monitor 104 transmits the collected and/or processed STV data 100 corresponding to the plurality of smart televisions to the example audience measurement monitor 114.

The example smart television 110 of FIG. 1 is a smart television (e.g., a television that is capable of transmitting and/or receiving data via a network). However, the example smart television 110 may be a radio, speakers, a projector, a computer, a computing device, a tablet, a mobile device, and/or any other device capable of outputting media and that is capable of transmitting and/or receiving data via a network. In the illustrated example of FIG. 1, the smart television 110 corresponds to one or more monitored panelists.

The example LPM 112 of FIG. 1 monitors media output by the example smart television 110. For example, the example LPM 112 is in communication with the example smart television 110 to collect and/or capture signals emitted externally by the smart television 110. The LPM 112 may be coupled with the smart television 110 via wired and/or wireless connection. The example LPM 112 may be implemented in connection with additional and/or alternative types of media presentation devices, such as, for example, a radio, a computer monitor, a video game console, and/or any other device capable of presenting media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or smart television 110. Additionally, the example meter data storage 118 receives and stores the example meter data 102 from the example LPM 112.

In some examples, the example LPM 112 of FIG. 1 includes a set of buttons assigned to audience members to enable the audience member(s) watching the example smart television 110 to self-identify. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the smart television 110. In other examples, the LPM 112 may include at least one sensor (e.g., a camera, a 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the smart television 110 is on and a user is present). The example meter data 102 may further include a household identification, a tuner key, a presentation start time, a presentation end time, a channel key, etc. Although the illustrated example illustrates the example audience measurement monitor 114 collecting the example meter data 102 from one LPM 112 at one location, the example audience measurement monitor 114 may collect meter data from any number and/or type of meters at any number of locations.

The example STV data 100 of FIG. 1 from the example smart television 106 and/or the example meter data 102 from the example LPM 112 is transmitted to the example audience measurement monitor 114 via a network. The network may be implemented using any type of public or private network, such as, but not limited to, the Internet, a telephone network, a local area network (LAN), a cable network, and/or a wireless network. To enable communication via the network, the example smart television 106 includes a communication interface that enables a connection to an Ethernet medium, a digital subscriber line (DSL), a telephone line, a coaxial cable, or any wireless connection, etc.

The example STV data storage 116 of the example audience measurement monitor 114 of FIG. 1 collects the example STV data 100 corresponding to the example smart television 106 and other smart television in a population of smart televisions. As described above, the example STV data 100 includes tuning data, control data, media data, timestamps, device identifiers, etc. corresponding to the example smart television 106. However, in some examples, the example STV data 100 may not include specific data identifying any information relating to the audience of the example smart television 106. In such examples, another device and/or processor models such audience information prior to storing in the example STV data storage 116. For example, the device and/or processor may assign and/or model virtual users to augment the example STV data 100, thereby generating audience assigned smart television data. Additionally or alternatively, the audience measurement monitor 114 may be hosted by any other entity or may be co-hosted by another entity(ies). For example, the example STV data 100 may be collected from the example smart television 106 by a media provider (e.g., a cable television provider, a satellite television provider, etc.) and the example meter data 102 may be collected from an LPM (e.g., such as the example LPM 112) by the example audience measurement monitor 114 cooperating with the media provider to gain access to the smart television data. The example audience measurement monitor 114 includes the example STV data storage 116 (e.g., a database) and the example meter data storage 118 (e.g., a database).

The example in-tab analyzer 120 of FIG. 1 receives the smart television data and/or meter data from panelists with smart televisions and obtained from a duration of time (e.g., an hour, a day, a week, etc.) from either the STV data storage 116, the meter data storage 118, and/or any other storage. The example in-tab analyzer 120 generates (e.g., trains) one or more models (e.g., machine learning (ML) models, AI-based models, deep learning models, neural networks, regression models, deep forests, etc.) to be able to predict whether a particular smart television is in-tab or out-of-tab based on the smart television data 100. To train the one or more models, the in-tab analyzer 120 generates training data using smart television data from a panelist that is labeled as in-tab or out-of-tab (e.g., based on the corresponding meter data 102). After the example in-tab analyzer 120 trains the model with the training data, the in-tab analyzer 120 can obtain smart television data that does not correspond to a panelist (e.g., therefore it is not known whether the smart television is in-tab or out-of-tab) and use the smart television data as inputs to the trained model to determine whether the smart television is in-tab or out-of-tab.

As described above, a smart television becomes out-of-tab when the smart television loses network connectivity, has poor network connectivity, and/or otherwise is unable to provide data to the example STV monitor 104. Accordingly, the STV monitor 104 may not be able to differentiate between when the smart television 106 is off and when the smart television 106 is on but out of tab (e.g., the STV monitor 104 assumes that the smart television 106 is off regardless), thereby leading to inaccurate media monitoring data (e.g., inaccurate crediting for media). Although some smart televisions may transmit network disconnect data (e.g., number of disconnects, length of disconnects, reason for disconnect etc.), most smart televisions inaccurately differentiate between being off and losing a connection. Accordingly, the STV data 100 may not accurately reflect the actual media being output by smart televisions. Thus, the example in-tab analyzer 120 determines whether a smart television is in-tab (e.g., if the data for the smart television corresponds to no media, it is because the smart television is off) or out-of-tab (e.g., if the data for the smart television corresponds to no media, the data is inaccurate because media was being output and such data should be discarded). In this manner, the example in-tab analyzer 120 can discard out-of-tab devices from media crediting determinations. The example in-tab analyzer 120 is further described below in conjunction with FIG. 2.

Figure 2:
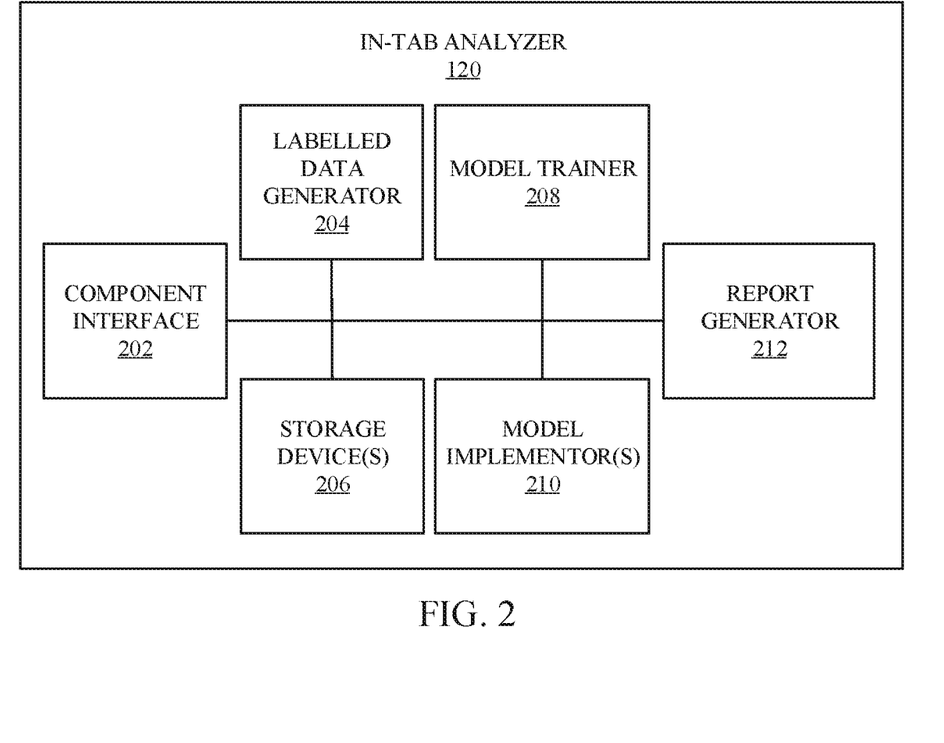
FIG. 2 is a block diagram of an example implementation of the in-tab analyzer of FIG. 1.

FIG. 2 is block diagram of an example implementation of the in-tab analyzer 120 of FIG. 1. The example in-tab analyzer 120 includes an example component interface 202, an example labelled data generator 204, example storage device(s) 206, an example model trainer 208, an example model implementor(s) 210, and an example report generator 212.

The example component interface 202 of FIG. 2 interfaces with the example STV data storage 116, the example meter data storage 118, and/or any other storage of the example audience measurement monitor 114 to access the STV data 100 and/or the meter data 102. For example, the component interface 202 may obtain STV data that corresponds to a specific identifier within a particular duration of time so that the example labelled data generator 204 can label the data as in-tab or out-of-tab to generate training data, as further described below. Additionally, the example component interface 202 may access all STV data corresponding to a particular region and/or duration of time to apply to a trained model, as further described below. In some examples, the component interface 202 is means for interfacing with the example STV data storage 116, the example meter data storage 118, and/or any other storage of the example audience measurement monitor 114 to access the STV data 100 and/or the meter data 102, and/or is means for accessing all STV data.

The example labelled data generator 204 of FIG. 2 generates training data by labelling STV data that corresponds to a panelist as in-tab and/or out-of-tab based on the meter data of the panelist. For example, the labelled data generator 204 may utilize one more techniques to be able to identify which identifiers from the STV data stored in the STV data storage 116 correspond to panelists. In some examples, the unique identifier of the smart television may be provided by the panelist. In some examples, the unique identifier may be unknown to the panelist. In such examples, the labelled data generator 204 may use the metered data of a panelist to determine whether media exposure data from the smart televisions is consistent with the media exposure data from a set top box by more than a threshold amount of data. For example, the labelled data generator 204 may attempt to find a device identifier that corresponds to a media exposure pattern of the tuning data that has more than 95% data (e.g., a threshold amount) in common with the media exposure pattern of a panelist from the meter data by more than a threshold amount. The example labelled data generator 204 links the panelist to corresponding smart television identifiers.

After the example labelled data generator 204 of FIG. 2 links panelists to smart television identifiers, the example labelled data generator 204 determines whether the tuning data from the smart television data for a particular duration of time is in-tab or out-of-tab by comparing the tuning data from the smart television data corresponding to the panelist to the meter data for the panelist. The labelled data generator 204 may make the determination based on data inconsistencies and/or panel in-tab rules. Data inconsistencies occur when the meter data of a panelists is inconsistent with tuning data of the corresponding smart television. For example, data inconsistencies occur when the meter data of a panelists indicate that the panelist was exposed to media from a smart television and the corresponding smart television data indicates that the smart television was off during the same duration of time. In such an example, the labelled data generator 204 labels the corresponding smart television data as out-of-tab, because the smart television data corresponding to the panelist is inconsistent with the meter data of the panelist. Panel in-tab rules correspond to whether or not a meter for a panelist has transmitted data within a threshold amount of time (e.g., because the meter does not have a sufficient network connection, is powered down, and/or is otherwise unable to transmit meter data to the audience measurement monitor 114). For example, if a meter is scheduled to submit meter data every hour, on the hour, the label data generator 204 may determine that the meter is out-of-tab when the meter doesn't transmit meter data within a threshold amount of time from an anticipated time of transmission, for example. In such an example, the label data generator 204 labels the corresponding smart television data (e.g., the smart television data including an identifier corresponding to the panelist) as out-of-tab (e.g., even if the television data is later transmitted at a later point in time). In some examples, the labelled data generator 204 is means for generating training data, means for identifying a first smart television that corresponds to a first panelist by comparing first data from the first smart television to second data from the first panelist, means for linking panelists to smart television identifiers, and/or means for determining whether the tuning data from the television data for a particular duration of time is in-tab or out-of-tab.

The example storage device(s) 206 of FIG. 2 store(s) the labelled data in conjunction with one or more particular regions and/or durations of time (e.g., during model training) and/or smart television data in conjunction with the one or more particular regions and/or durations of time (e.g., for use in a trained model to determine in-tab vs. out-of-tab). Additionally, the example storage device(s) may store trained models. Additionally, the example storage device(s) 206 may store the results (e.g., outputs) generated by a trained model. In this manner, the example report generator 212 can process and/or analyze the results for smart televisions in a particular region and/or for a particular duration to credit media based on in-tab smart televisions. The example storage device(s) 206 may be separate storage devices (e.g., one for the labelled data, one for the smart television data, one for the trained model(s), one for the results), may be a single storage device (e.g., for the labelled data, the smart television data, the trained model(s), and the results), and/or any combination thereof. In some examples, the storage device(s) 206 is/are means for storing labelled data, results, and/or trained models.

The example model trainer 208 of FIG. 2 trains the models (e.g., AI model(s), neural network(s), machine learning model(s), deep learning model(s), convolution neural network(s), another type(s) of AI-based model(s) and/or network(s)) stored in the example storage device(s) 206. Initially, a model(s) is/are untrained (e.g., the neurons are not yet weighted). The example model trainer 208 of FIG. 2 trains one or more models based on known (e.g. labelled) tab status (e.g., in-tab or out-of-tab) (e.g., as desired outputs) and corresponding STV data (e.g., as inputs). The STV data may include (A) tuning data (e.g., which may be linked to media), including the amount of tuning by the smart television 106 per duration of time (e.g., a day), an average amount of tuning per a first duration of time (e.g., a day) or a sub-duration of time, the average amount of tuning across a second duration of time (e.g., a week, a month, etc.), a standard deviation in tuning per the first duration of time of the sub-duration of time, a standard deviation in tuning across the second duration of time, (B) disconnect data, including a number of disconnects per the first duration of time or the sub-duration of time, a length of the disconnects per the first duration of time or the sub-duration of time, whether the disconnect(s) correspond to a shut-off event (e.g., turn off, loss of power, and/or any other event that causes media to not be output by the smart television 106) vs. a disconnect-type event (e.g., loss of network, technical problem, and/or any other event that causes the smart television 106 to not transmit collected data to the STV monitor 104), volume data, channel change information, application information, timestamp(s), (C) timestamps (e.g., corresponding to tuning events, disconnect events, media exposure events, etc.), (D) a smart television identifier, and/or (E) any other information corresponding to the use of the smart television 106, including interaction with buttons on the smart television and/or a controller, time-of-day, time-of-week, time-of-year, etc. In some examples, the example model trainer 208 weights parameters of a model to configure the model to predict tab status based on smart television data. For example, the model trainer 208 may develop a logistic regression model based on the labelled data. In some examples, the model trainer 208 may develop a random forest model based on the labelled data. In some examples, the model trainer 208 may adjust weights for neurons of a neural network based on the labelled data (e.g., training data). In some examples, the model trainer 208 is means for training a model.

After a model is trained, the example model implementor(s) 210 of FIG. 2 obtains STV data and/or subdata (e.g., the type of STV data and/or subdata used to train the model) corresponding to a particular location and/or duration for time and, uses the trained model, outputs an estimated in-tab status (e.g., whether a particular smart television is in-tab or out-of-tab based on the corresponding STV data). The output estimate is a value indicative of a probability that the smart television corresponding to the input STV data is in-tab or a probability that the smart television corresponding to the input STV data is out-of-tab. The example model implementor 210 may determine whether the corresponding STV device is in-tab or out-of-tab by comparing the output probability to a threshold. For example, if the model outputs a value (e.g., between 0 and 1) that a smart television is out of tab and the threshold is set to 0.7 or 70%, the model implementor 210 will mark the corresponding STV as in-tab if the output value is more than 0.7 or 70% or mark the corresponding STV as out-of-tab if the output value is less than 0.7 or 70%. The threshold may be any threshold and/or may be based on user and/or manufacturer preferences.

In some examples, the model implementor(s) 210 of FIG. 2 are multiple implementers utilizing different models trained for different sets of STV data. For example, there may be a first model implementor 210 to utilize a first model to determine tab status for a first location and/or a first duration of time and a second model implementor 210 to utilize a second model to predict tab status for a second location and/or second duration of time, where the first location and/or first duration may or may not overlap (e.g., partially or fully) the second location and/or second duration. In such an example, the first location may be a first city and the second location may be a different city, a state that includes the first city, etc. In some examples, the model implementor(s) 210 is a single model implementor that is capable of implementing multiple models stored in the storage device(s) 206. In some examples, the model implementor(s) 210 of FIG. 2 is means for obtaining STV data and/or subdata, means for using the trained model, and/or means for outputting an estimated in-tab status.

The example report generator 212 of FIG. 2 generates a report including in-tab information and/or crediting information. Because STV data from out-of-tab smart televisions appear to be off (e.g., when they may be on), including STV data from out-of-tab televisions leads to inaccurate media exposure data. Accordingly, the report generator 212 may remove data from out-of-tab smart televisions to generate more accurate media exposure metrics (e.g., smart television media crediting). The report generator 212 may include information corresponding to the outputs of the model (e.g., the number of in-tab smart televisions for the duration and/or location, the number of out-of-tab smart televisions for the duration and/or location, and/or a comparison of tab status to different and/o previous determinations corresponding to the different locations and/or different durations of time). The report may be a document and/or a data packet that includes the report. In this manner, the example component interface 202 can transmit the report to the client and/or another device for further processed (e.g., develop demographic data) via a network. In some examples, the report generator 212 is means for generating a report.

While an example manner of implementing the example in-tab analyzer 120 of FIG. 1 is illustrated in FIG. 2, one or more of the elements, processes and/or devices illustrated in FIGS. 1 and/or 2 may be combined, divided, re-arranged, omitted, eliminated and/or implemented in any other way. Further, the example component interface 202, the example labelled data generator 204, the example storage device(s) 206, the example model trainer 208, the example model implementor(s) 210, the example report generator 212, and/or, more generally, the example in-tab analyzer 120 of FIGS. 1 and/or 2 may be implemented by hardware, software, firmware and/or any combination of hardware, software and/or firmware. Thus, for example, any of the example component interface 202, the example labelled data generator 204, the example storage device(s) 206, the example model trainer 208, the example model implementor(s) 210, the example report generator 212, and/or, more generally, the example in-tab analyzer 120 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 202, the example labelled data generator 204, the example storage device(s) 206, the example model trainer 208, the example model implementor(s) 210, the example report generator 212, and/or, more generally, the example in-tab analyzer 120 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example in-tab analyzer 120 of FIGS. 1 and/or 2 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
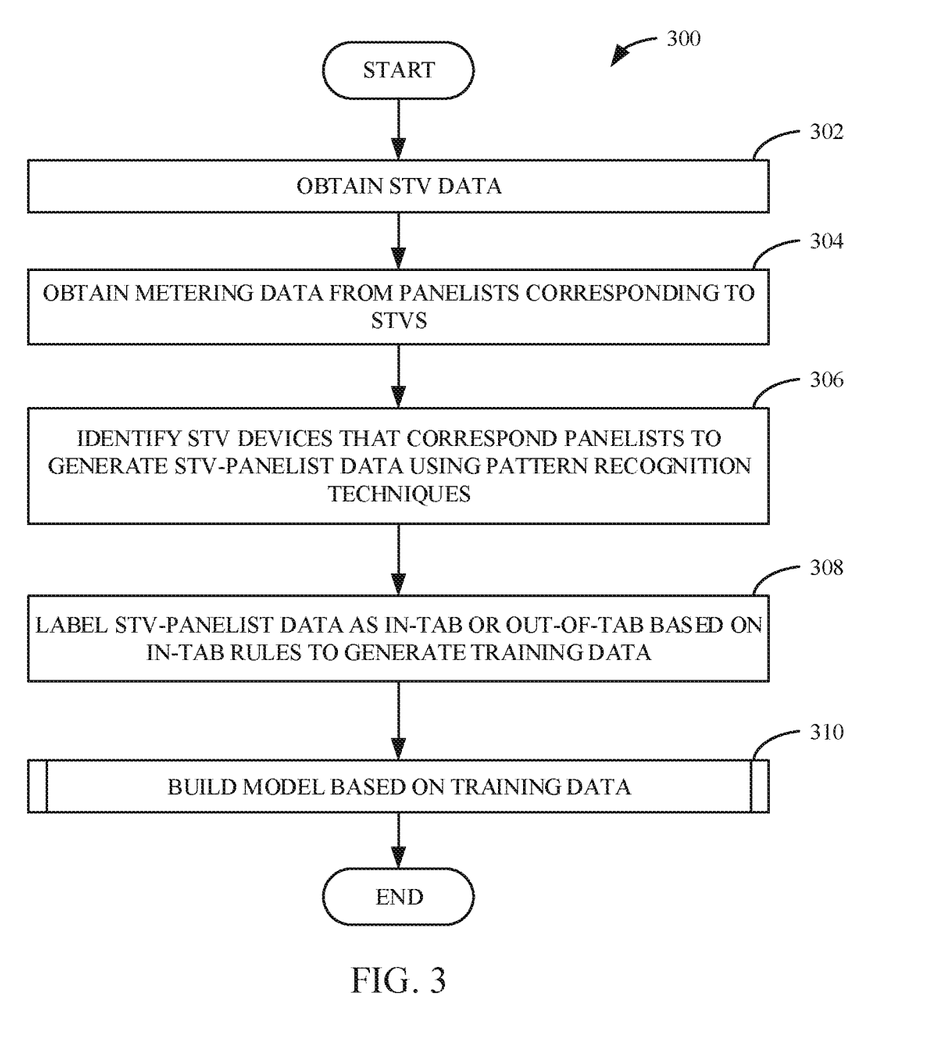
FIG. 3 is a flowchart representative of machine readable instructions which may be executed to implement the example in-tab analyzer of FIGS. 1 and/or 2 to train a model to determine whether a smart device is out-of-tab.
Figure 4:
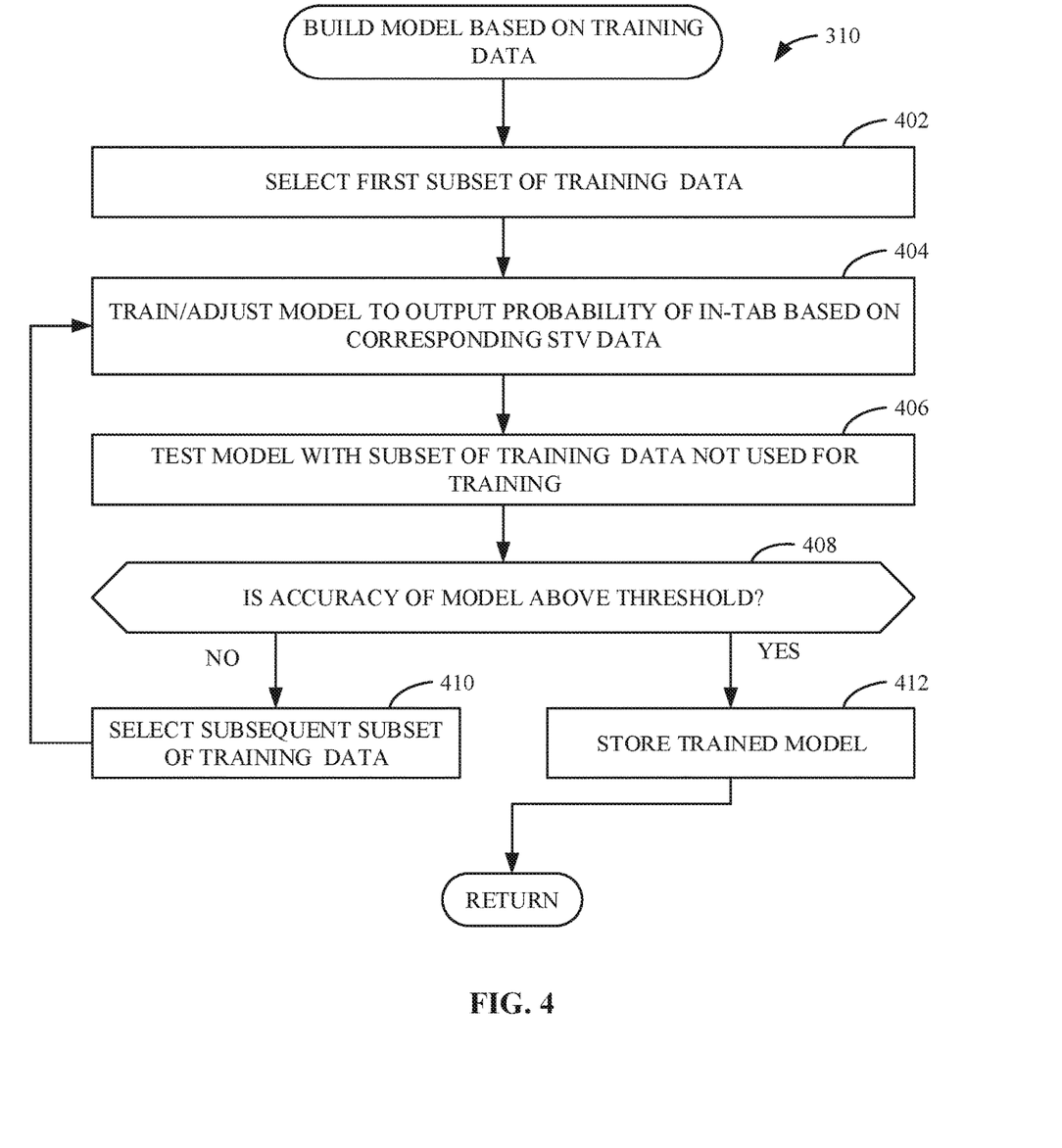
FIG. 4 is a flowchart representative of machine readable instructions which may be executed to implement the example in-tab analyzer of FIGS. 1 and/or 2 to build a model based on training data.
Figure 5:
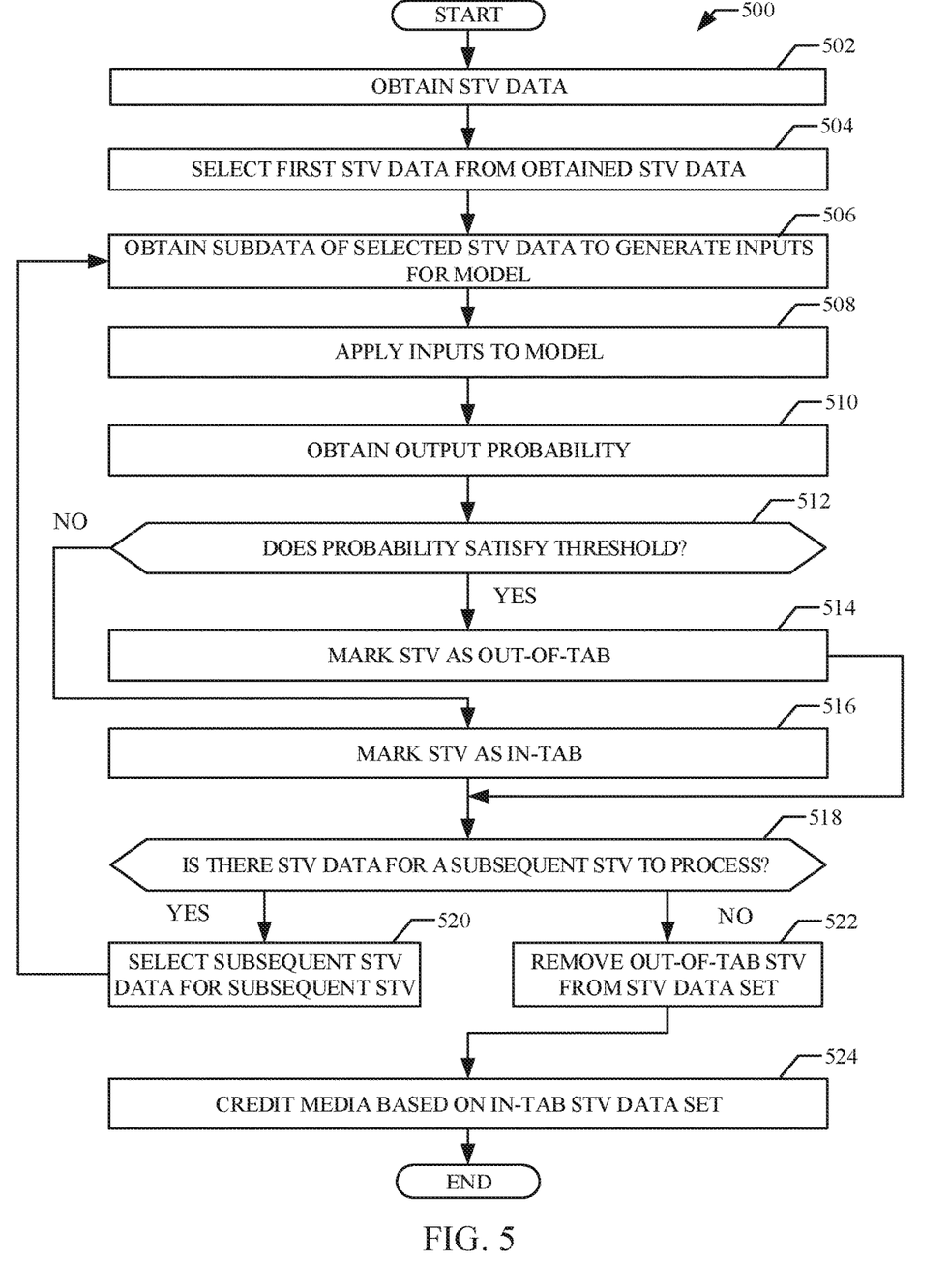
FIG. 5 is a flowchart representative of machine readable instructions which may be executed to implement the example in-tab analyzer of FIGS. 1 and/or 2 to determine whether a smart device is out-of-tab using a trained model.

Flowcharts representative of example hardware logic, machine readable instructions, hardware implemented state machines, and/or any combination thereof for implementing the example in-tab analyzer 120 of FIGS. 1 and/or 2 are shown in FIGS. 3-5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIG. 6 many other methods of implementing the example in-tab analyzer 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine readable instructions 300 that may be executed to implement the example in-tab analyzer 120 of FIG. 2 to generate training data and train one of the models for a particular location using the training data. Although the instructions 300 are described in conjunction with the example in-tab analyzer 120 of FIG. 2, the instructions 300 may be described in conjunction with any type of in-tab analyzer.

At block 302, the example component interface 202 accesses and/or obtains STV data from the example STV data storage 116. The example component interface 202 accesses the STV data corresponding to a particular duration of time, a particular location. The duration of time and/or particular location is based on how the model will be implemented (e.g., based on user and/or manufacturer preferences). For example, a model that is trained based on daily data from smart televisions in the United States will be used to predict daily tab status for smart televisions in the United States.

At block 304, the example component interface 202 accesses and/or obtains meter data corresponding to panelists that own smart televisions from the example meter data storage 118. The component interface 202 obtains meter data corresponding to the same location and/or duration of the obtained STV data. At block 306, the example labelled data generator 204 identifies STV devices from the STV data that correspond to panelists to generate linked STV-panelist data (e.g., STV data that is linked to a panelist) using pattern recognition techniques. As described above in conjunction with FIG. 2, if an identifier of the STV is known (e.g., provided from the panelist), the labelled data generator 204 finds the STV data corresponding to the identifier. If the identifier of the STV is not known, the labelled data generator 204 may link STV data to a panelist by attempting to find a match between the meter data of a panelist and the tuning data of a STV, as described above in conjunction with FIG. 2.

At block 308, the example labelled data generator 204 labels the linked STV-panelist data as in-tab or out-of-tab based on data inconsistencies (e.g., between the meter data of the panelist and the tuning data of the linked smart television) and/or in-tab rules to generate the training data. As described above in conjunction with FIG. 2, data inconsistencies occur when the meter data of a panelists indicates that the panelists was exposed to media from a smart television and the smart television data indicates that the smart television was off for the smart television corresponding to the panelist during the same duration of time, for example. Panel in-tab rules correspond to whether or not a meter for a panelist has transmitted data within a threshold amount of time (e.g., because the meter does not have a sufficient network connection, is powered down, and/or is otherwise unable to transmit meter data to the audience measurement monitor 114). At block 310, the example in-tab analyzer 120 builds a model based on training data, as further described below in conjunction with FIG. 4.

FIG. 4 is a flowchart representative of machine readable instructions 310 that may be executed to implement the example in-tab analyzer 120 of FIG. 2 to build a model based on training data. Although the instructions 400 are described in conjunction with the example in-tab analyzer 120 of FIG. 2, the instructions 310 may be described in conjunction with any type of in-tab analyzer.

At block 402, the example model trainer 208 selects a first subset of the training data (e.g., 70% of the training data). At block 404, the example model trainer 208 trains (e.g., during an initial iteration) and/or adjusts (e.g., during a subsequent iteration) the model to output the tab status of a labelled STV-panelist data (e.g., a value indicative of a probability that the device is in-tab and/or out-of-tab) based on the corresponding STV data of the subset. For example, the model trainer 208 may adjust the weights of neurons in a neural network, build a regression model, and/or develop a random forest so that the input STV data will result in the corresponding tab state output when applied to the model (e.g., the neural network, the regression model, the random forest). The example model trainer 208 may train the model based on a subset of the corresponding STV data (e.g., subdata). The subset may include one or more of types of STV data that may be included in the STV data. For example, the subset may include one or more of the amount of tuning by the smart television 106 per duration of time (e.g., a day), an average amount of tuning per a first duration of time (e.g., a day) or a sub-duration of time, the average amount of tuning across a second duration of time (e.g., a week, a month, etc.), a standard deviation in tuning per the first duration of time of the sub-duration of time, a standard deviation in tuning across the second duration of time, a number of disconnects per the first duration of time or the sub-duration of time, a length of the disconnects per the first duration of time or the sub-duration of time, whether the disconnect(s) correspond to a shut-off event vs. a disconnect-type event, volume data, channel change information, application information, timestamp(s), time-of-day, time-of-week, time-of-year, etc.

At block 406, the example model trainer 208 tests the model with a subset of training data not used for training. For example, the model trainer 208 may use the labelled STV-panelist data of the subset of the training data that has not been used to train and/or adjust the model as inputs and may determine the accuracy of the model by comparing the output tab state with the corresponding tab states from the subset of the training data. The more output tab states that match the corresponding training data, the higher the accuracy of the model. At block 408, the example model trainer 208 determines if the accuracy of the model is above a threshold.

If the model trainer 208 determines that the accuracy of the model is not above the threshold (block 408: NO), the model trainer 208 selects a subsequent subset of training data that has not been used to train and/or adjust the model (block 410), and control returns to block 404 to adjust the model based on the subsequent subset to increase the accuracy of the model. If the model trainer 208 determines that the accuracy of the model is above the threshold (block 408: YES), the model trainer 208 stores the trained model in the example storage device 206 (block 412).

FIG. 5 is a flowchart representative of machine readable instructions 500 that may be executed to implement the example in-tab analyzer 120 of FIG. 2 to determine whether a smart television is in-tab or out-of-tab to more accurately credit media exposure. Although the instructions 500 are described in conjunction with the example in-tab analyzer 120 of FIG. 2, the instructions 300 may be described in conjunction with any type of in-tab analyzer.

At block 502, the example component interface 202 obtains data (e.g., smart television data) from the example STV data storage 116. The example smart television data may be the smart television data for a particular duration of time and/or for a particular location. At block 504, the example model implementor 210 selects first STV data (e.g., the STV data that corresponds to a first identifier) from the obtained STV data. In some examples, the first STV data corresponds to data for the duration of time (e.g., the smart television data with the first smart television identifier at different points of time during a day). In such examples, the model marks the entire duration of time (e.g., the day) as in-tab or out-of-tab. In some examples, the first STV data corresponds to data for a sub duration of the duration of time (e.g., an hour of the day). In such examples, the model marks the sub durations of time as in-tab or out-of-tab. Thus, a device may have some sub durations of time marked as in-tab and other durations of time marked as out-of-tab.

At block 506, the example model implementor 210 obtains subdata from the selected STV data to generate inputs for the model. The subdata may be the same as the subdata was used to train the model. For example, if the model was trained based on an average amount of tuning of a smart television per hour within a day and the standard deviation of tuning of the smart television per hour with the day, the model implementor 210 obtains the average amount of tuning and the standard deviation from the selected STV data to be used as an input into the trained model. If the model was generated using all STV data, then the model implementor 210 will use all the subdata from the selected STV data.

At block 508, the example model implementor 210 applies the inputs (e.g., the subdata from the selected STV data) to the trained model stored in the example storage device 206. At block 510, the example model implementor 210 obtains output probabilities from the trained model. The output probability may be a probability (e.g., a value indicative of the probability) that the smart television corresponding to the selected STV data is in-tab or a probability (e.g., a value indicative of the probability) that the smart television corresponding to the selected STV data is out-of-tab. At block 512, the example model implementor 210, determines if the output probability satisfies a threshold. For example, if the model outputs a probability that a smart device is out-of-tab and the threshold is set to 0.8 or 80%, the model implementor 210 determines whether the output probability satisfies the threshold when the output is higher than 0.8 or 80%. The threshold may be based on user and/or manufacturer preferences. Satisfying a threshold may mean being above the threshold or below the threshold depending on how the model is trained (e.g., to output a probability corresponding to in-tab or to output a probability corresponding to out-of-tab).

If the example model implementor 210 determines that the output probability satisfies the threshold (block 512: YES), the model implementor 210 marks the STV as out-of-tab (block 514). If the example model implementor 210 determines that the output probability does not satisfy the threshold (block 512: NO), the example model implementor 210 marks the STV as in-tab (block 516). As described above, block 514 and 516 may be flipped depending on what the output of the model corresponds to (e.g., probability of in-tab or probability of out of time).

At block 518, the example model implementor 210 determines whether there is STV data for a subsequent STV to process. If the example model implementor 210 determines that there is STV data for a subsequent STV to process (block 518: YES), the example model implementor 210 selects the subsequent STV data for the subsequent STV (block 520) and control returns to block 506 to determine whether the subsequent STV is in-tab or out-of-tab. If the example model implementor 210 determines that there is STV data for a subsequent STV to process (block 518: NO), the example report generator 212 removes the out-of-tab STV data from the STV data set (block 522). At block 524, the example report generator 212 credits the media based on the remaining in-tab STV data set. In this manner, the media crediting corresponds to in-tab STV rather than including potentially inaccurate out-of-tab data.

Figure 6:
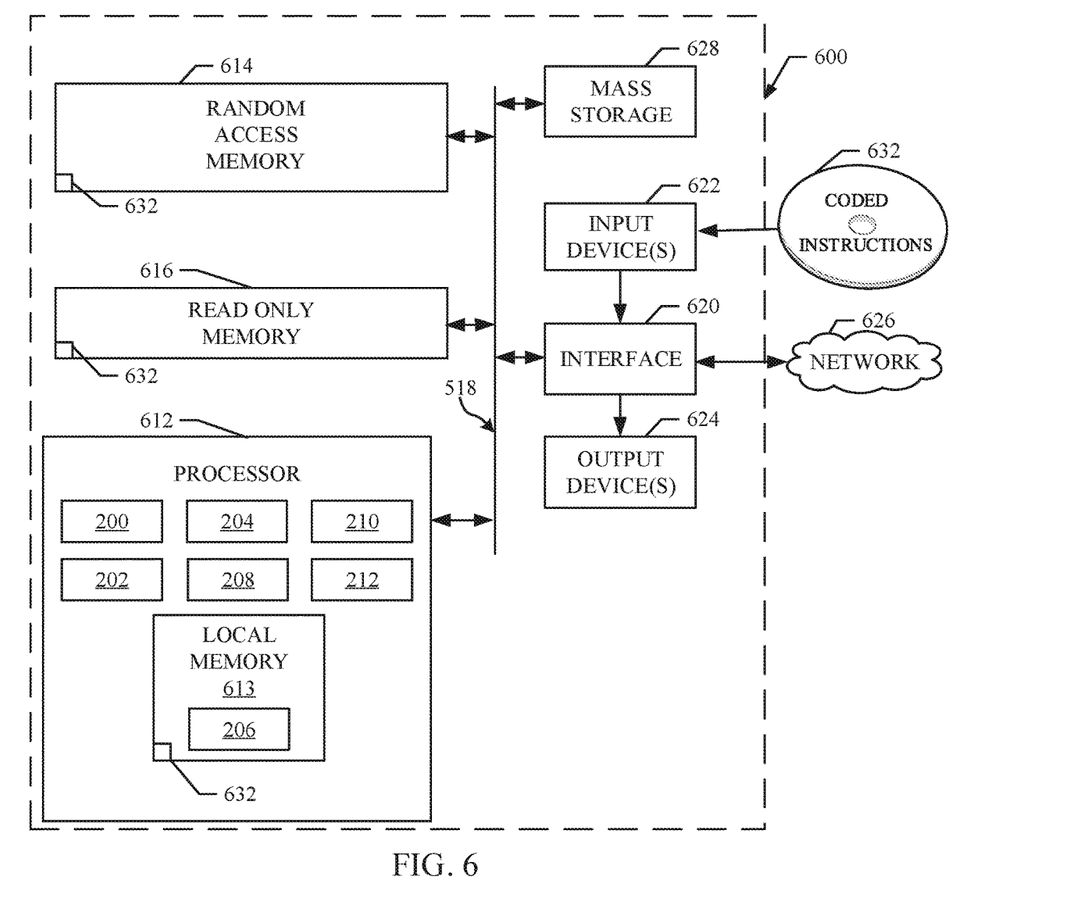
FIG. 6 is a block diagram of an example processing platform structured to execute the instructions of FIGS. 3-5 to implement the example in-tab analyzer of FIGS. 1 and/or 2.

FIG. 6 is a block diagram of an example processor platform 600 structured to execute the instructions of FIGS. 3-5 to implement the in-tab analyzer 120 of FIG. 2. The processor platform 600 can be, for example, a server, a personal computer, a workstation, a web plugin tool, a self-learning machine (e.g., a neural network), a mobile device (e.g., a cell phone, a smart phone, a tablet such as an iPad), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 202, the example labelled data generator 204, the example model trainer 208, the example model implementor(s) 210, and the example report generator 212.

The processor 612 of the illustrated example includes a local memory 613 (e.g., a cache). In this example, the local memory 613 implements the example storage device(s) 206. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3-5 may be stored in the mass storage device 628, in the volatile memory 614, in the non-volatile memory 616, and/or on a removable non-transitory computer readable storage medium such as a CD or DVD.

Example methods, apparatus, systems, and articles of manufacture to determine whether a smart device is in-tab are disclosed herein. Further examples and combinations thereof include the following: Example 1 includes an apparatus comprising a labelled data generator to identify a first smart television that corresponds to a first panelist by comparing first data from the first smart television to second data from the first panelist, and generate training data by labelling the first smart television as in-tab or out-of-tab based on the second data from the first panelist, and a model trainer to train a model using the training data, the model trainer to train the model to determine a tab status for a second smart television.

Example 2 includes the apparatus of example 1, wherein the first data includes at least one of a media identifier, a smart television identifier, a timestamp, tuning data, or disconnect data.

Example 3 includes the apparatus of example 1, wherein the second data is meter data indicative of media exposure of the first panelist.

Example 4 includes the apparatus of example 1, wherein the labelled data generator is to identify that the first smart television corresponds to the first panelist when a threshold amount of tuning data of the first data is consistent with the second data.

Example 5 includes the apparatus of example 1, wherein the labelled data generator is to label the first smart television as out-of-tab when tuning data of the first data is inconsistent with meter data of the second data.

Example 6 includes the apparatus of example 1, further including a model implementor to implement the model to determine the tab status for the second smart television based on third data from the first smart television.

Example 7 includes the apparatus of example 6, wherein the tab status is at least one of in-tab or out-of-tab.

Example 8 includes the apparatus of example 6, wherein the third data is part of fourth data from a population of smart televisions, the second smart television included in the population.

Example 9 includes the apparatus of example 8, further including a report generator to in response to the model determining that the second smart television is out-of-tab, remove the third data from the fourth data, and credit media based on the fourth data.

Example 10 includes a non-transitory computer readable storage medium comprising instructions which, when executed cause one or more processors to at least identify a first smart television that corresponds to a first panelist by comparing first data from the first smart television to second data from the first panelist, generate training data by labelling the first smart television as in-tab or out-of-tab based on the second data from the first panelist, and train a model using the training data to determine a tab status for a second smart television.

Example 11 includes the computer readable storage medium of example 10, wherein the first data includes at least one of a media identifier, a smart television identifier, a timestamp, tuning data, or disconnect data.

Example 12 includes the computer readable storage medium of example 10, wherein the second data is meter data indicative of media exposure of the first panelist.

Example 13 includes the computer readable storage medium of example 10, wherein the instructions cause the one or more processors to identify that the first smart television corresponds to the first panelist when a threshold amount of tuning data of the first data is consistent with the second data.

Example 14 includes the computer readable storage medium of example 10, wherein the instructions cause the one or more processors to label the first smart television as out-of-tab when tuning data of the first data is inconsistent with meter data of the second data.

Example 15 includes the computer readable storage medium of example 10, wherein the instructions cause the one or more processors to implement the model to determine the tab status for the second smart television based on third data from the first smart television.

Example 16 includes the computer readable storage medium of example 15, wherein the tab status is at least one of in-tab or out-of-tab.

Example 17 includes the computer readable storage medium of example 15, wherein the third data is part of fourth data from a population of smart televisions, the second smart television included in the population.

Example 18 includes the computer readable storage medium of example 17, wherein the instructions cause the one or more processors to in response to the model determining that the second smart television is out-of-tab, remove the third data from the fourth data, and credit media based on the fourth data.

Example 19 includes a method to determine a status of a smart television, the method comprising identifying, by executing an instruction with a processor, a first smart television that corresponds to a first panelist by comparing first data from the first smart television to second data from the first panelist, generating, by executing an instruction with the processor, training data by labelling the first smart television as in-tab or out-of-tab based on the second data from the first panelist, and training, by executing an instruction with the processor, a model using the training data to determine a tab status for a second smart television.

Example 20 includes the method of example 19, wherein the first data includes at least one of a media identifier, a smart television identifier, a timestamp, tuning data, or disconnect data.

Example 21 includes the method of example 19, wherein the second data is meter data indicative of media exposure of the first panelist.

Example 22 includes the method of example 19, further including identifying that the first smart television corresponds to the first panelist when a threshold amount of tuning data of the first data is consistent with the second data.

Example 23 includes the method of example 19, further including labelling the first smart television as out-of-tab when tuning data of the first data is inconsistent with meter data of the second data.

Example 24 includes the method of example 19, further including implementing the model to determine the tab status for the second smart television based on third data from the first smart television.

Example 25 includes the method of example 24, wherein the tab status is at least one of in-tab or out-of-tab.

Example 26 includes the method of example 24, wherein the third data is part of fourth data from a population of smart televisions, the second smart television included in the population.

Example 27 includes the method of example 26, further including in response to the model determining that the second smart television is out-of-tab, removing the third data from the fourth data, and crediting media based on the fourth data.

Example 28 includes an apparatus comprising means for identifying a first smart television that corresponds to a first panelist by comparing first data from the first smart television to second data from the first panelist, the means for identifying to generate training data by labelling the first smart television as in-tab or out-of-tab based on the second data from the first panelist, and means for training a model using the training data, the means for training to train the model to determine a tab status for a second smart television.

Example 29 includes the apparatus of example 28, wherein the first data includes at least one of a media identifier, a smart television identifier, a timestamp, tuning data, or disconnect data.

Example 30 includes the apparatus of example 28, wherein the second data is meter data indicative of media exposure of the first panelist.

Example 31 includes the apparatus of example 28, wherein the means for identifying is to identify that the first smart television corresponds to the first panelist when a threshold amount of tuning data of the first data is consistent with the second data.

Example 32 includes the apparatus of example 28, wherein the means for identifying is to label the first smart television as out-of-tab when tuning data of the first data is inconsistent with meter data of the second data.

Example 33 includes the apparatus of example 28, further including means for implementing the model to determine the tab status for the second smart television based on third data from the first smart television.

Example 34 includes the apparatus of example 33, wherein the tab status is at least one of in-tab or out-of-tab.

Example 35 includes the apparatus of example 33, wherein the third data is part of fourth data from a population of smart televisions, the second smart television included in the population.

Example 36 includes the apparatus of example 35, further including means for, in response to the model determining that the second smart television is out-of-tab, removing the third data from the fourth data, the means for removing to credit media based on the fourth data.

From the foregoing, it will be appreciated that example methods, apparatus and articles of manufacture have been disclosed that determine whether a smart television is out-of-tab. The disclosed methods, apparatus and articles of manufacture develop a model that determines whether a smart television is in-tab or out-of-tab based on smart television data (e.g., tuning data, disconnect data, etc.) using panelist data. A smart television is out-of-tab when the smart television does not transmit tuning data when it is supposed to. In this manner, out-of-tab devices appear to be not presenting media even though they are presenting media. Accordingly, out-of-tab smart televisions lead to inaccurate media exposure data. Some smart televisions provide disconnect data. However, the disconnect data may be inaccurate because smart televisions can confuse a network disconnect with a power down event (e.g., turning the television off).

Out-of-tab devices (e.g., due to network issues) and/or inaccurate disconnect data from smart televisions result in inaccurate and/or misleading media monitoring data. Examples disclosed herein use a machine learning model (e.g., training using panelist-based training data) that determines whether a smart television is in-tab or out-of-tab based on the smart television data (e.g., tuning data, disconnect data, etc.). Because out-of-tab devices lead to inaccurate media exposure metrics, examples disclosed herein remove out-of-tab smart televisions (e.g., determined using the machine learning model) from the smart television data to determine more accurate media exposure metrics. Accordingly, the disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a labelled data generator to:
     identify a first smart television that corresponds to a first panelist by comparing first data from the first smart television to second data from the first panelist; and
     generate training data by labelling the first smart television as in-tab or out-of-tab based on the second data from the first panelist; and
   a model trainer to train a model using the training data, the model trainer to train the model to determine a tab status for a second smart television.

2. The apparatus of claim 1, wherein the first data includes at least one of a media identifier, a smart television identifier, a timestamp, tuning data, or disconnect data.

3. The apparatus of claim 1, wherein the second data is meter data indicative of media exposure of the first panelist.

4. The apparatus of claim 1, wherein the labelled data generator is to identify that the first smart television corresponds to the first panelist when a threshold amount of tuning data of the first data is consistent with the second data.

5. The apparatus of claim 1, wherein the labelled data generator is to label the first smart television as out-of-tab when tuning data of the first data is inconsistent with meter data of the second data.

6. The apparatus of claim 1, further including a model implementor to implement the model to determine the tab status for the second smart television based on third data from the first smart television.

7. The apparatus of claim 6, wherein the tab status is at least one of in-tab or out-of-tab.

8. The apparatus of claim 6, wherein the third data is part of fourth data from a population of smart televisions, the second smart television included in the population.

9. The apparatus of claim 8, further including a report generator to:
   in response to the model determining that the second smart television is out-of-tab, remove the third data from the fourth data; and
   credit media based on the fourth data.

10. A non-transitory computer readable storage medium comprising instructions which, when executed cause one or more processors to at least:
    identify a first smart television that corresponds to a first panelist by comparing first data from the first smart television to second data from the first panelist;
    generate training data by labelling the first smart television as in-tab or out-of-tab based on the second data from the first panelist; and
    train a model using the training data to determine a tab status for a second smart television.

11. The computer readable storage medium of claim 10, wherein the first data includes at least one of a media identifier, a smart television identifier, a timestamp, tuning data, or disconnect data.

12. The computer readable storage medium of claim 10, wherein the second data is meter data indicative of media exposure of the first panelist.

13. The computer readable storage medium of claim 10, wherein the instructions cause the one or more processors to identify that the first smart television corresponds to the first panelist when a threshold amount of tuning data of the first data is consistent with the second data.

14. The computer readable storage medium of claim 10, wherein the instructions cause the one or more processors to label the first smart television as out-of-tab when tuning data of the first data is inconsistent with meter data of the second data.

15. The computer readable storage medium of claim 10, wherein the instructions cause the one or more processors to implement the model to determine the tab status for the second smart television based on third data from the first smart television.

16. The computer readable storage medium of claim 15, wherein the tab status is at least one of in-tab or out-of-tab.

17. The computer readable storage medium of claim 15, wherein the third data is part of fourth data from a population of smart televisions, the second smart television included in the population.

18. The computer readable storage medium of claim 17, wherein the instructions cause the one or more processors to:
    in response to the model determining that the second smart television is out-of-tab, remove the third data from the fourth data; and
    credit media based on the fourth data.

19. A method to determine a status of a smart television, the method comprising:
    identifying, by executing an instruction with a processor, a first smart television that corresponds to a first panelist by comparing first data from the first smart television to second data from the first panelist;
    generating, by executing an instruction with the processor, training data by labelling the first smart television as in-tab or out-of-tab based on the second data from the first panelist; and
    training, by executing an instruction with the processor, a model using the training data to determine a tab status for a second smart television.

20. The method of claim 19, wherein the first data includes at least one of a media identifier, a smart television identifier, a timestamp, tuning data, or disconnect data.

* * * * *